F. A. CREED.
FRUIT GATHERER.
APPLICATION FILED FEB. 4, 1915. RENEWED MAY 3, 1918.
1,286,947.
Patented Dec. 10, 1918.
2 SHEETS—SHEET 2.
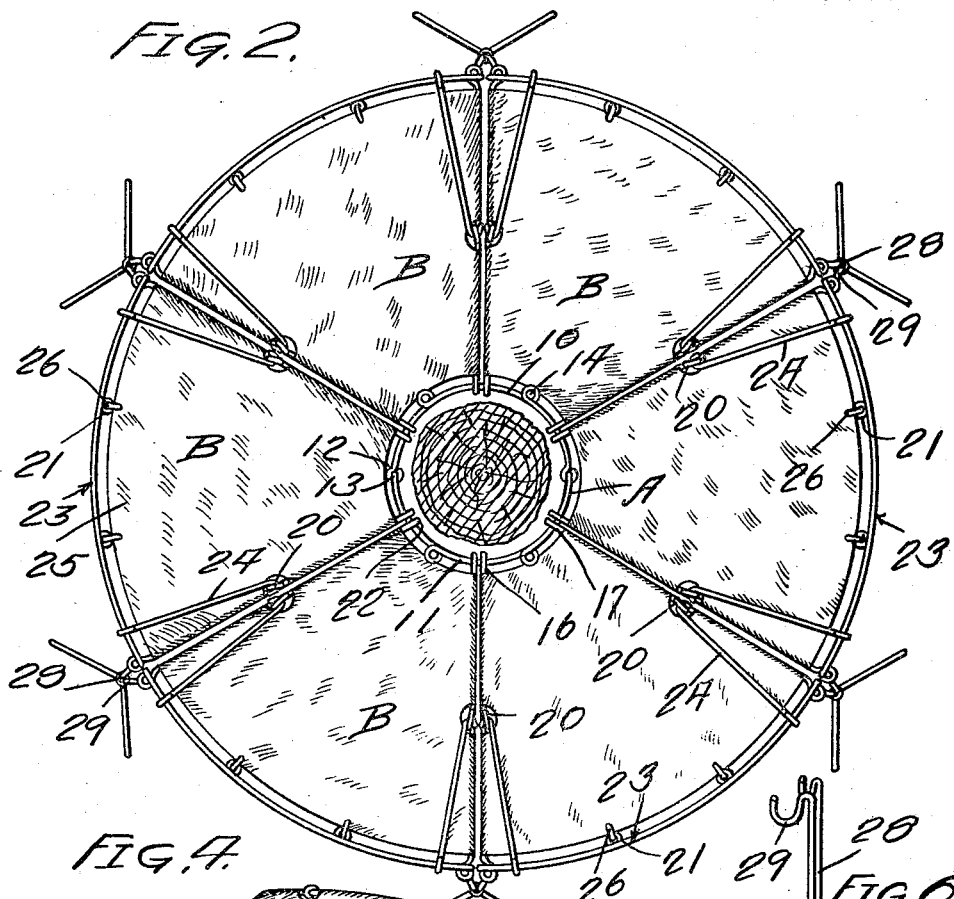
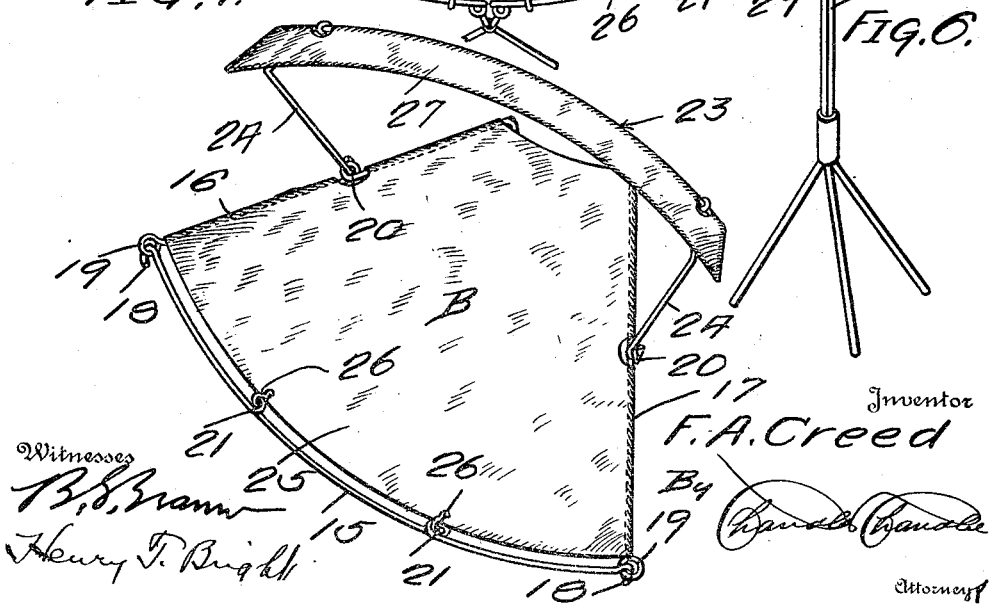

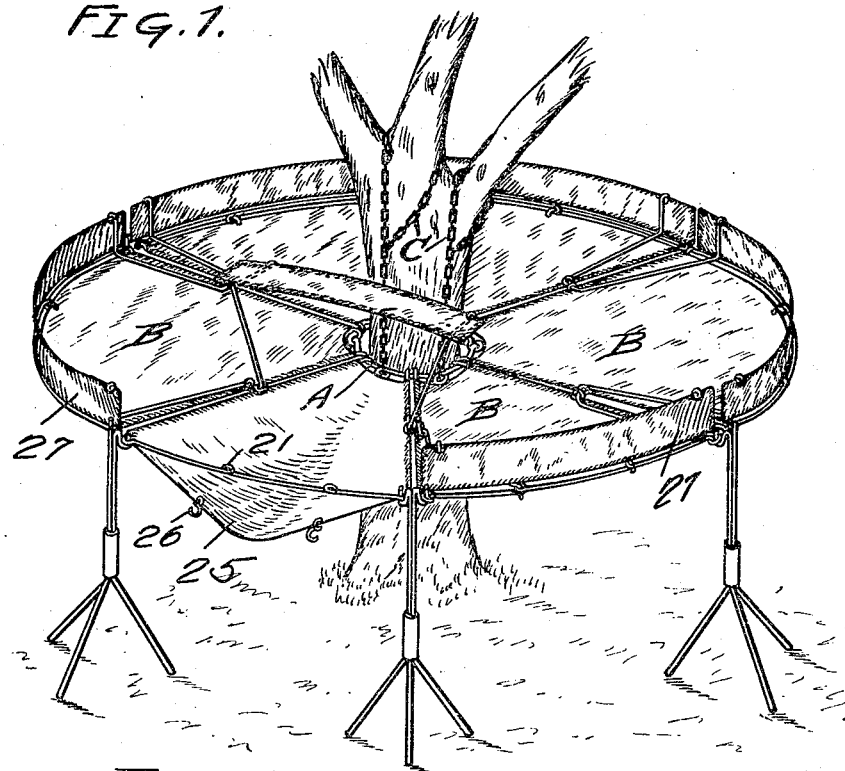
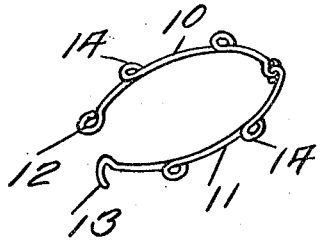

UNITED STATES PATENT OFFICE.

FRED A. CREED, OF SAN FRANCISCO, CALIFORNIA.

FRUIT-GATHERER.

1,286,947. Specification of Letters Patent. Patented Dec. 10, 1918.

Application filed February 4, 1915, Serial No. 6,116. Renewed May 3, 1918. Serial No. 232,378.

*To all whom it may concern:*

Be it known that I, FRED A. CREED, a citizen of the United States, residing at San Francisco, in the county of San Francisco, State of California, have invented certain new and useful Improvements in Fruit-Gatherers; and I do hereby declare the following to be a full, clear, and exact description of the invention, such as will enable others skilled in the art to which it appertains to make and use the same.

This invention relates to fruit gatherers, and is particularly adapted for use in gathering prunes or other fruit which is allowed to ripen and fall from the tree before same is collected.

The object of the invention resides in the provision of a fruit gatherer of the character named embodying novel features of construction whereby desired fruit may be easily and quickly gathered, and the slow and tiresome method of collecting same from the ground entirely eliminated.

A further object of the invention resides in the construction of a device of this character which may be compactly folded when not in use so that same will occupy a minimum amount of space and the handling, shipping and storing of same facilitated.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a perspective view showing the improved fruit gatherer applied to a tree, the rim element of one of the sections of the gatherer being swung to a position so as to not interfere with the delivery of the fruit from that section into a suitable receptacle;

Fig. 2, a transverse section taken on Fig. 1 just above the central connecting ring of the device;

Fig. 3, a perspective view of the central connecting ring of the device with the free ends of the sections of said ring out of interlocking relation;

Fig. 4, a perspective view of one of the sections of the device with the rim element elevated;

Fig. 5, a perspective view of one of the sections of the device with the fabric entirely removed, and Fig. 6, a perspective view of one of the leg members of the device.

Referring to the drawings the invention is shown as comprising a central connecting ring A and a plurality of segmental sections B radiating from said ring. The connecting ring A is formed of pivotally connected sections 10 and 11 the free ends of which are provided respectively with an eye 12 and a hook 13 adapted to be engaged through the eye to secure the ring around the trunk of a tree. The sections 10 and 11 are provided at spaced points with eye members 14 for a purpose that will presently appear. The sections B each comprises an outer member 15 and side members 16 and 17, said side members being pivotally connected to the terminals of the outer member 15 by means of interlocking hooks and eyes 18 and 19 respectively, the former being formed on the terminals of the member 15. The side members 16 and 17 are provided intermediate their ends respectively with eyes 20, while the member 15 is provided at spaced points with eyes 21. The free ends of the side members 16 and 17 are provided respectively with hooks 22 adapted to be engaged over the ring in setting up the device as will be obvious. Each section B further comprises a rim frame 23 provided with arms 24 the free ends of which are pivotally engaged through the eyes 20. The side members 16 and 17 are connected by a fabric 25, while the edge of said fabric adjacent the member 15 is provided with hooks 26 adapted to be engaged in respective eyes 21. The rim frame 23 is also covered with fabric 27.

The device may be made up of three or more sections B and in setting the device up the arms 16 and 17 have their hook terminals 22 engaged over the ring A, while adjacent sections B are supported by legs 28 the upper ends of which are provided with prongs 29 detachably engaged through adjacent eyes 19. When the device is thus set up it will be obvious that the fruit will fall from the tree upon the fabrics 25. When a sufficient quantity of fruit has fallen and it is desired to gather same it is only necessary to swing the rim frame 23 away from the member 15 and then disengage the hooks 26 from the eyes 21 when the fruit on the fabric 25 of a given section B can be forced by gravity into a suitable receptacle. This operation is repeated for each section until all the fruit is gathered.

The ring A is adapted to be suspended at a desired elevation through the medium of chains C which are engaged around the limbs of a tree and have their lower ends connected with respective eyes 14.

It will be further obvious that the device is so constructed that the various parts can be easily and quickly detached from each other so as to permit of same being compactly folded for convenience in shipping or storing.

While the frame portion of the device may be constructed in various ways it has been found desirable and advantageous to utilize a relatively stout wire in this connection so that the various eyes and hooks can be formed with ease and at small expense by simply bending the material.

What is claimed is:—

1. A fruit gatherer comprising a central connecting ring adapted to be secured in encircling relation to a tree trunk at a desired elevation, a plurality of independent segmental frames formed independently of the ring and having their inner ends detachably connected with said ring, means for supporting the outer ends of said frames, and a fabric connecting the members of each frame.

2. A fruit gatherer comprising a central connecting ring adapted to be secured in encircling relation to a tree trunk at a desired elevation, a plurality of independent segmental frames having their inner ends detachably connected with said ring, means for supporting the outer ends of said frames, and a fabric connecting the members of each frame, the outer edge of each fabric being of greater length than the corresponding side of the related frame and detachably connected to the corresponding member of the frame.

3. A fruit gatherer comprising a central connecting ring adapted to be secured in encircling relation to a tree trunk at a desired elevation, a plurality of independent segmental frames having their inner ends detachably connected with said ring, means for supporting the outer ends of said frames, a fabric connecting the members of each frame, and a rim member pivoted to each frame and movable to and from a position contiguous with the outer member of the frame.

4. A fruit gatherer comprising a central connecting ring adapted to be secured in encircling relation to the trunk of a tree at a desired elevation, a plurality of independent segmental frames having their inner ends detachably connected with said ring, legs supporting the outer ends of said frames, a fabric connecting the members of each frame, the upper end of each leg embodying a pair of supporting arms engaged respectively with adjacent frames.

In testimony whereof I affix my signature in the presence of two witnesses.

FRED A. CREED.

Witnesses:
F. W. CRAWFORD,
A. J. NAGLE.

Copies of this patent may be obtained for five cents each, by addressing the "Commissioner of Patents, Washington, D. C."